June 14, 1955   O. L. WHITTLE   2,710,544
FASTENERS FOR LAMINATED DRIVING BELTS
Filed Sept. 4, 1951
Fig. 1.
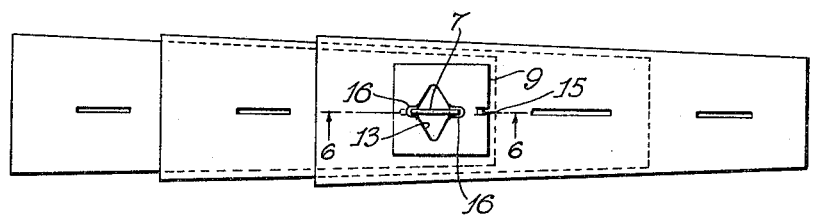
Fig. 2.
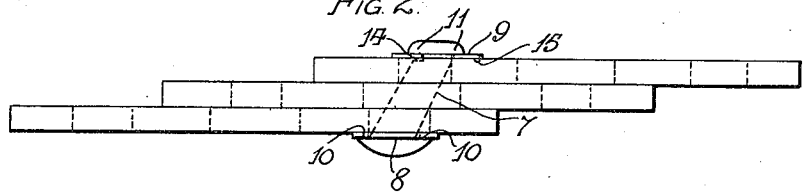
Fig. 3.
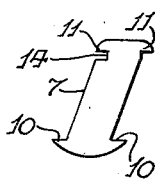
Fig. 5.
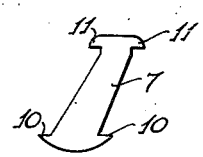
Fig. 6.
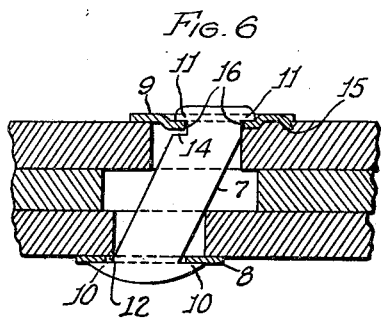
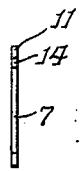
Fig. 4.
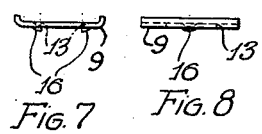
Fig. 7.   Fig. 8.
Inventor
Oscar Lyon Whittle
By *[signature]*
Atty.

United States Patent Office 2,710,544
Patented June 14, 1955

2,710,544

FASTENERS FOR LAMINATED DRIVING BELTS

Oscar Lyon Whittle, Warrington, England

Application September 4, 1951, Serial No. 245,043

6 Claims. (Cl. 74—235)

This invention has reference to fasteners for laminated driving belts and has for its object to provide an improved fastener of the kind having a flat shank which is passed through longitudinal openings in the imbricated laminations.

In making flat shank fasteners with heads which lie against the face of the bottom lamination it is advantageous to use metal made in a sectional shape from which the fasteners can be cut off, but under present conditions of supply it is difficult to get such sections and will probably be still more difficult, so it is desirable to find an alternative way of effecting the same ends.

By means of this present invention the difficulty of having to use material of special section is overcome without affecting the efficiency of the fastener.

According to the invention a fastener of the flat shank kind for use in a laminated belt is made with a shank made from a flat piece of metal formed with slots or shoulders in front and behind at one end for holding a securing head, and with shoulders in front and behind at the other end against which a plate having an opening to pass down the shank to form a foot to the shank is held, the foot lying against the under-side of the bottom lamination.

The invention is more particularly set forth with reference to the accompanying drawings in which:

Fig. 1 is a plan of a section of belting in which the laminations are held together by a fastener according to the invention;

Fig. 2 is an elevation of the structure shown in Fig. 1;

Fig. 3 is a side elevation of one form of fastener shank;

Fig. 4 is a left end view of same;

Fig. 5 is a side elevation of an alternate form of shank;

Fig. 6 is an enlarged section on the line 6—6 of Fig. 1;

Fig. 7 is a side elevation of the head member;

Fig. 8 is an end elevation of same.

As shown in the drawings the fastener comprises three parts namely, a shank 7, a detachable foot 8 and a detachable head 9.

The shank is made from a flat piece of metal and has, at the ends shoulders projecting in front and behind which form stops for holding the head and foot.

The shoulders 10 form the stops for the foot 8 and the shoulders 11 form the stops for the head 9 and it will be understood that as the foot 8 must pass over the top end of the shank in order to slide down to its position at the bottom, the opening 12 in the foot 8 must be large enough to pass over the top and not large enough to pass over the bottom, or, conversely the shank 7 must be narrower at the top than at the bottom.

The head 9 is different from the foot as it has to be able to pass over the top and also to be retained by the shoulders 11. To this end the head 9 is provided with an opening 13 having a dimension which will pass over the top and a smaller dimension which will pass under the shoulders 11.

In applying or removing the head, therefore, it is necessary to turn the head through an angle in order to bring the larger or smaller dimension of the opening 13 into the desired position.

As shown in Fig. 2 the belt laminations are pressed together between the head 9 and foot 8 which exert a distributed pressure on the top and bottom layers. In order to reduce the possibility of cutting the top layer should there be some extraordinary pressure placed on the head 9, slot 14 is provided on the left hand edge of the shank 7 as shown in Figs. 3, 4 and 6. The slot 14 is adapted to receive the head 9. The shank shown in Fig. 5 is also suited for holding the head member in position by virtue of the divergence of its sides from the shoulders 11 to the bottom shoulders 10.

Both the head 9 and foot 8 may be flat, but it is preferred to have them somewhat curved as shown in Fig. 7, the purpose of which is to prevent the back and front edges from digging into the belt as it bends.

The head 9 which, as already stated must be turned to apply and remove it may have a slight projection 15 at one end to press into the fabric of the belt. As is clearly shown in Figs. 7 and 8 the head 9 has a depression 16 formed in the sides of the opening 13 which support the shoulders of the shank. On the top surface of the head, the depressions provide recesses which receive the shoulders 11 and accordingly prevent any relative turning movement between the shank and the head member. The depressions 16 project below the bottom surface of the head 9 and as shown in Fig. 6, are adapted to dig slightly into the top belt layer in a similar manner to the projection 15. A positive grip between the fastener and the driving belt is thus provided.

I claim:

1. A fastener for securing together the laminations of a laminated belt, comprising a flat shank adapted to pass through and closely fit within slits in the belt, said shank being tapered and inclined and having lateral projections on either end and in the plane of the shank both at the top end and at the bottom end, the projections at the top end being smaller than those at the bottom end, a slotted foot member whose slot is adapted to pass over the top projections for location against the bottom projections, and a slotted head member whose slot has one dimension large enough to pass over the top projections and a smaller dimension whereby said head member may be turned axially for location under the top projections and resting on the belt.

2. The combination with a plurality of laminations of a laminated belt having slit-like openings therein and arranged to be secured together of a fastener comprising a flat shank portion adapted to pass through and closely fit within said slit-like openings, said shank being tapered and inclined and having lateral projections on both ends and in the plane of the shank, the projections at the top end being smaller than those at the bottom end and being made by providing notches in the edges of said shank near the top so that the projections are above the notches, a slotted foot member whose slot is adapted to pass over the top projections for location against the bottom projections, and a slotted head member whose slot has one dimension large enough to pass over the top projections and a smaller dimension whereby said head member may be turned axially for location in the said notches under the top projections.

3. In combination with a plurality of laminations of a belt having slit-like openings in the laminations elongated in the longitudinal direction of the belt and disposed in line, a fastener for securing said laminations together face to face comprising a flat plate having a shank portion adapted to pass through said openings and having a width and a thickness so related to the length and width respectively of said openings to cause said shank portion to fit in securing position in said openings with the width of said shank extending along the length of the openings and having a width greater than the width of said openings, whereby said shank portion in securing position of the fastener is locked against rotation in said openings, said fastener having in the plane of said shank portion, opposed lateral projections at the top of the shank portion and opposed lateral projections at the bottom of the shank portion, the distance from tip to tip of the projections at the top end being less than the distance from tip to tip of the projections at the bottom end, the top and bottom projections defining seats along their inner edges, a substantially flat foot member having an elongated slot large enough to permit said foot member to pass freely over the top projections but small enough to cause said foot member to seat on both projections at the bottom and to be locked against rotation on said shank portion about an axis extending lengthwise of said shank portion, said foot member in secured position of said fastener being retained on said shank portion, being seated on said bottom projections and being held against the face of an outside belt lamination, and a substantially flat head member having a slot, one dimension of which is greater than the width of the fastener at the projecting top end to permit said head member to pass freely over said top projections into one rotative position of said head member, and another dimension smaller than the width of the fastener at the projecting top end, to lock said head member in seating engagement with the underside of said top projections against axial withdrawal from said shank portion in another rotative position of said head member, the slot in said head member being shaped between the regions having said different dimensions to permit rotation of said head member on said shank portion about said axis from the first of said positions to the other of said positions.

4. The combination as described in claim 3, said head member and said top projections having latch means by which said head member is locked to said top projections against rotation about said axis automatically when said head member is rotated from said first mentioned rotative position to said second mentioned rotative position.

5. The combination as described in claim 3, the slit-like openings in said belt laminations being aligned in an inclined direction with respect to the planes of said laminations, said projection seats being parallel, said shank portion being inclined with respect to the planes of said projection seats and thereby with the planes of the foot member and said head member, when said members are seated against the bottom projections and top projections respectively in secured position of the fastener, to permit said shank portion to extend through said inclined lamination openings with said foot member and said head member extending parallel and against the outside laminations respectively.

6. The combination as described in claim 3, the slit-like openings in said belt laminations being aligned in an inclined direction with respect to the planes of said laminations, said projection seats being parallel, said shank portion being inclined with respect to the planes of said projection seats and thereby with the planes of the foot member and said head member, when said members are seated against the bottom projections and top projections respectively in secured position of the fastener, to permit said shank portion to extend through said inclined lamination openings with said foot member and said head member extending parallel and against the outside laminations respectively, said shank portion tapering towards its top, said head member and said top projections having latch means by which said head member is locked to said shank portion against rotation about said axis when said head member is rotated from said first mentioned rotative position to said second mentioned rotative position.

References Cited in the file of this patent

UNITED STATES PATENTS

| 1,666,783 | Kries | Apr. 17, 1928 |
| 2,485,010 | Nicolet | Oct. 18, 1949 |

FOREIGN PATENTS

| 26,490 | Great Britain | of 1905 |
| 523,337 | Great Britain | July 11, 1940 |
| 637,627 | Great Britain | May 24, 1950 |
| 126,431 | Australia | Dec. 23, 1947 |